United States Patent [19]

Spears et al.

[11] Patent Number: 5,165,658
[45] Date of Patent: Nov. 24, 1992

[54] PLASTIC BALL VALVE BALL SEAL MEANS

[75] Inventors: Ricky E. Spears; Frank D. Sears; Stephen M. Horvath, all of Sulphur Springs, Tex.

[73] Assignee: M&FC Holding Company, Inc., Wilmington, Del.

[21] Appl. No.: 879,746

[22] Filed: May 6, 1992

Related U.S. Application Data

[62] Division of Ser. No. 817,698, Jan. 7, 1992.

[51] Int. Cl.$^5$ .............................................. F16K 5/06
[52] U.S. Cl. ................................... 251/315; 251/170
[58] Field of Search ................................ 251/170, 315

[56] References Cited

U.S. PATENT DOCUMENTS

| 3,083,945 | 4/1963 | Shafer et al. | 251/170 X |
| 3,401,914 | 9/1968 | Shand | 251/315 X |
| 3,780,986 | 12/1973 | Fujiwara | 251/315 |
| 3,860,032 | 1/1975 | Rogers | 137/614.17 |
| 4,047,275 | 9/1977 | Bake et al. | 29/157.1 R |
| 4,203,460 | 5/1980 | Priese | 137/240 |
| 4,399,976 | 8/1983 | Legris | 251/315 X |
| 4,558,874 | 12/1985 | Williams et al. | 277/112 |

Primary Examiner—John C. Fox
Attorney, Agent, or Firm—Lorusso & Loud

[57] ABSTRACT

A plastic ball valve having improved ball sealing means.

4 Claims, 3 Drawing Sheets

PLASTIC BALL VALVE BALL SEAL MEANS

CROSS-REFERENCE TO RELATED APPLICATION

This is a division of application Ser. No. 07/817,698, filed Jan. 7, 1992 in the name of Ricky E. Spears, et al.

BACKGROUND OF THE INVENTION

1. Field of the Invention

This invention relates to valves and is directed more particularly to plastic ball valves of the type typically used with plastic pipe in gas distribution lines.

2. Description of the Prior Art

The provision of plastic ball valves for use in plastic pipe, particularly in gas distribution systems, is well known. U.S. Pat. No. 4,047,275 issued Sep. 13, 1977 to Earl A. Bake, et al, for example, describes an all-plastic valve and a method for assembling the valve. The Bake et al valve includes a main body and two end sections which, with components assembled therein, are fused together to provide a valve body having conduits extending therefrom and adapted for connection to a plastic pipe.

In keeping with environmental concerns, it is deemed beneficial to reduce to the extent possible, and eliminate where possible, any leakage from such valves. Accordingly, there is need in the industry for a valve adapted for use underground in gas distribution system, as in the Bake et al valve, but improved with respect to the sealing means resident in the valve to prevent, or at least minimize, undesirable emissions.

It is also deemed beneficial to provide such a valve in which the number of parts is reduced and/or the number of major steps in assembling the valve is reduced.

SUMMARY OF THE INVENTION

An object of the present invention is, therefore, to provide improved sealing means for a ball member of a plastic ball valve, of the type above described, which sealing means may be put in place during assembly of the valve and may be depended upon to self-adjust to movement of the ball member during assembly of the valve, to maintain sealing engagement with the ball member.

With the above and other objects in view, as will hereinafter appear, and in accordance with a feature of the present invention there is provided in a ball valve comprising a body member, conduit means extending from the body member, the conduit means defining a flow passageway therein extending through the chamber, the body member having a bore therein normal to the flow passageway, a ball member disposed in the chamber and movable between closed and open positions in the flow passageway, a valve stem disposed in the bore and connected to the ball member, a pair of annular seals disposed in the chamber and adapted to engage the ball member, and a seal retainer for each annular seal and adapted each to retain one of the annular seals, an improvement in which the seal retainers are movable in grooves in the chambers to permit floating of the seals, such that the seals and the seal retainer maintains contact which the ball member in assembly of the valve.

The above and other features of the invention, including various novel details of construction and combinations of parts, will now be more particularly described with reference to the accompanying drawings and pointed out in the claims. It will be understood that the particular valve embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENT

Figure 2:
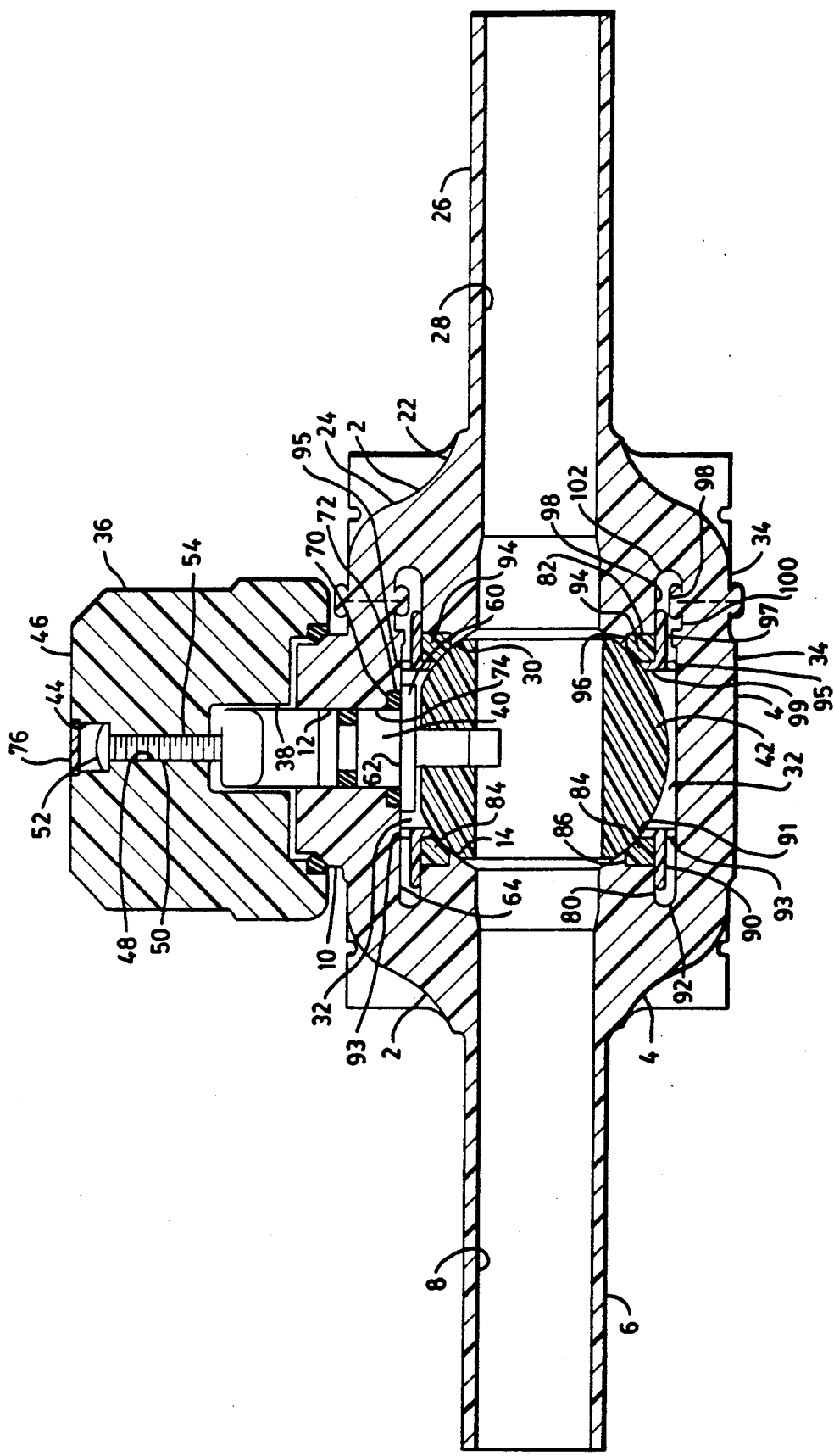
FIG. 2 is a sectional view of the ball valve, taken along line II—II of FIG. 1, illustrative of an embodiment of the invention.
Figure 3:
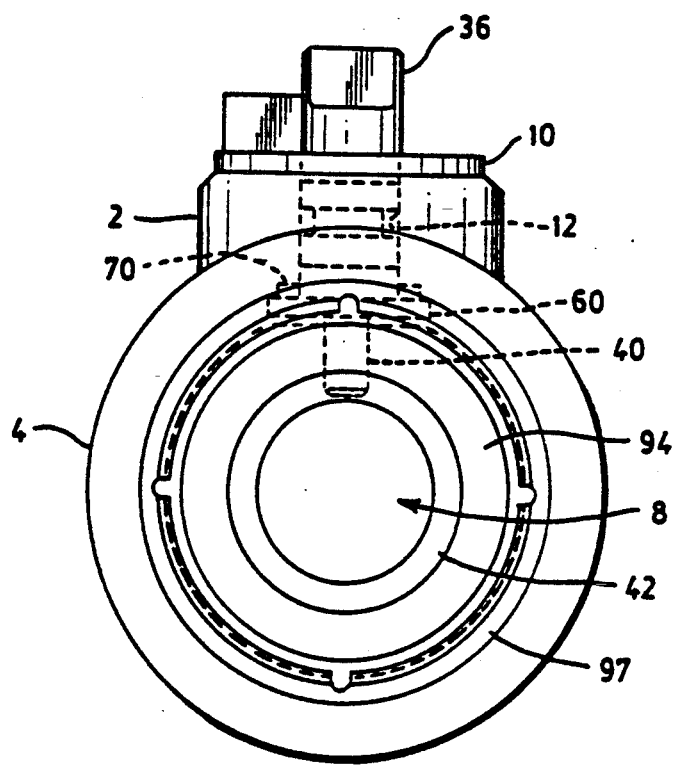
FIG. 3 is an end elevational view of the first body portion of the valve, as seen from the second body portion.

Referring to the drawings, it will be seen that an illustrative embodiment of the invention includes a first plastic valve member 2 having a first body portion 4. A first conduit portion 6 extends from the first body portion 4 and the first conduit and body portions 6,4 have therein a first flow passageway 8 (FIG. 2). A valve stem housing portion 10 extends from the first body portion 4 substantially normal to said first conduit portion 6 and has therein a bore 12. The first body portion 4 has therein a cavity 14, the cavity 14 being intersected by the first flow passageway 8 and the bore 12.

The illustrative ball valve further includes a second plastic valve member 22 (FIGS. 1 and 2) having a second body portion 24. A second conduit portion 26 extends from the second body portion 24 and the second conduit and body portions 26, 24 have therein a second flow passageway 28 (FIG. 2), adapted to be aligned with the first flow passageway 8. The second body portion 24 has therein a wall portion 30 adapted to close the cavity 14 so as to form a chamber 32.

The first and second valve members 2, 22 are adapted to be fused together to form a complete valve body 34.

On the valve stem housing portion 10, there is rotatably mounted a handle 36 having therein a bore 38 (FIG. 2) comprising a continuation of the valve stem housing portion bore 12. In the bore 12,38 there is disposed a valve stem 40 connected to a ball member 42 disposed in the chamber 32. The valve stem 40 is rotatable with the handle 36 to effect movement of the ball member 42 in the chamber 32 between open and closed positions relative to the flow passageways 8, 28.

In the handle 36, there is a recess 44 (FIG. 2) in a top surface 46 of the handle. Extending from the recess 44 is a segment 48 of the handle bore 38 of reduced diameter. A screw 50 is disposed in the bore segment 48, with a head portion 52 of the screw 50 residing in the recess 44. A shank portion 54 of the screw threadedly engages the valve stem 40.

The valve stem 40 includes a flange 60 extending radially outwardly from the stem and disposed in the chamber 32. The flange 60 is provided with a surface 62 engageable with an upper surface 64 of the chamber. An elastomeric sealing ring 70 is disposed around the valve stem, abutting the stem, abutting the flange surface 62, and disposed in an annular groove 72 in a wall 74. Upon clockwise rotation of the screw 50, the stem 40 and the flange 60 are caused to move upwardly, as viewed in FIG. 2, with the flange 60 forced to move toward the chamber upper surface 64. Such movement of the flange 60 compresses the sealing ring 70 axially of the stem, causing expansion of the sealing ring radially of the stem to effect a tight seal between the stem 40 and the valve body 34, to prevent leakage from the chamber 32 around the stem 40. Accordingly, the screw 50 comprises a seal-setting screw which permits selective setting of sealing pressure exercised by the sealing ring 70.

Figure 1:
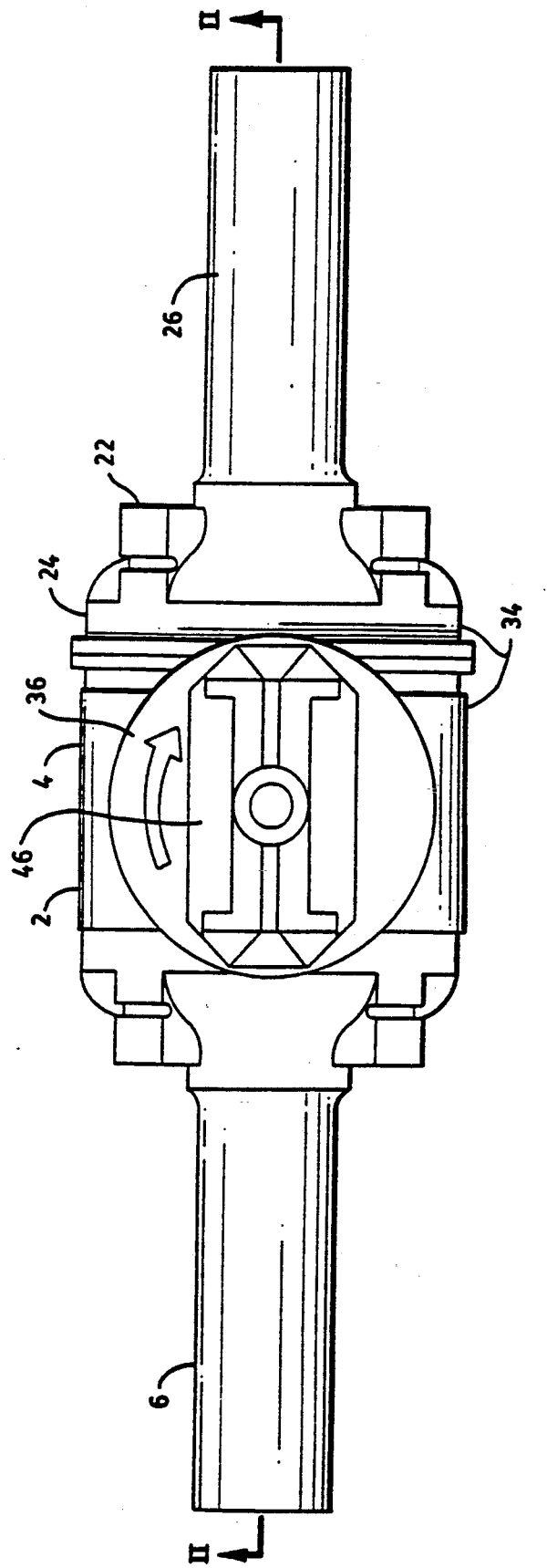
FIG. 1 is a top plan view of a plastic ball valve.

The handle 36 is of a plastic material. After the seal-setting screw 50 has been turned as desired, the handle recess 44 may be covered with a plastic plug member 76 (FIG. 1). Preferably, the plug member 76 is fused to the handle 36, as by ultrasonic welding, to hermetically isolate the screw head portion 52 from the elements and from tampering, as well as to effect an environmental seal. If preferred, however, the plug member 76 and the recess 44 may be complementarily configured for other means of bonding, such as for a "snap-in" arrangement, whereby the plug member 76 is simply pushed into a location past detents, or the like, not shown, which snap behind the plug to permanently lock the plug member in place.

The valve body 34 is provided with a pair of annular grooves 80, 82 open to the cavity 14. In the groove 80, there is disposed a first seat member 84, which preferably is of an elastomeric material and which rests in a seat member portion 86 (FIG. 2) of the groove 80. The first seat member 84 is adapted to abut the ball member 42. In the groove 80, there is also disposed a first seat member retainer 90, which preferably is of a rigid plastic of an L-shaped configuration in cross-section, and is movably retained in an elongated seat retainer portion 92 of the groove 80. A head portion 91 of the seat member retainer 90 abuts the ball member 42 and serves to retain the first seat member 84. The seat retainer portion 92 of the groove 80 is defined by inner and outer concentric walls interconnected by an end wall formed in the chamber and permits slidable movement of the first seat member retainer 90 therein axially of the valve flow path. The first seat member retainer 90 is provided with outwardly extending detents 93 which abut a wall of the retainer portion 92 of the groove 80.

Similarly, in the groove 82, there is located a second seat member 94, preferably of a elastomeric material, which rests in a seat member portion 96 of the groove 82. The second seat member 94 is adapted to abut the ball member 42. In the groove 82, there is also located a second seat member retainer 97, of a rigid plastic and L-shaped in cross-section (FIG. 2). The second seat member retainer 97 is movably retained in an elongated seat retainer portion 98 of the groove 82. A head portion 99 of the L-head second seat member retainer 97 abuts the ball member 42 and serves to retain the second seat member 94. The seat retainer portion 98 of the groove 82 permits is defined by inner and outer concentric walls inteconnected by an end wall formed in the chamber and slidable movement of the second seat member retainer 97 therein axially of the valve flow path. The second seat member retainer 97 is provided with outwardly extending detents 95 which abut a wall of the retainer portion 98 of the groove 82.

Prior to assembly of the valve body 34, the above-mentioned annular groove 80, including portions 86 and 92, are disposed in the first valve body portion 4. A portion 100 of the annular groove 82 is disposed in the first valve body portion 4. The remainder 102 of the annular groove 82, including the seat member portion 96 and part of the seat retainer portion 98, are located in the second valve body portion 24.

In assembly of the valve, the annular first seat member 84 is placed in the seat member portion 86 of the annular groove 80. The annular first seat member retainer 90 is then slid into the seat retainer portion 92 of the annular groove 80. The valve stem 40 and ball member 42, connected together, are then inserted into the valve stem housing portion 10 of the first body portion 4, and the cavity 14, such that the ball member 42 rests against the first seat member 84 and the first seat member retainer 90, and the valve stem 40 upstands from the valve stem housing 10.

The second valve member 22, with the second seat member 94 mounted in the second seat member portion 96 of the groove 82, and the second seat retainer 97 resting on a wall portion of the groove portion 102, is then mated with the first valve member 2 and the two members are fused together, to capture the ball member 42, the seat members 84, 94 and the seat member retainers 90, 97 in the chamber 32. As the fusing process takes place, and the valve body portions 4, 24 are pressed together, the seat member retainers 90, 97 slide in the groove portions 92, 98 to clamp the seat members 84, 94 in ball abutting positions.

The screw 50 is then inserted into the handle bore 48 and threadedly engaged with the valve stem 40. The screw 50 is turned to set the sealing ring 70, as above described. The plug member 76 is then fused or otherwise bound, in the handle recess 44 to isolate the screw head portion 52.

There is thus provided a plastic ball valve having only two body portions fused together, a valve stem sealing means which can be set from outside the assembled valve, means for then isolating the seal setting means, and sealing means in the valve chamber which adapt to changing conditions in the valve chamber during assembly.

It is to be understood that the present invention is by no means limited to the particular construction herein disclosed and/or shown in the drawings, but also comprises any modification or equivalents within the scope of the claims.

Having thus described our invention, what we claim as new and desire to secure by Letters Patent of the United States is:

1. In a ball valve comprising a valve body, conduit portions extending from said valve body, said valve body having a chamber therein, said conduit portions defining a flow passageway therein extending through said chamber, said valve body having a bore therein normal to said flow passageway, a ball member disposed in said chamber and movable between closed and open positions in said flow passageway, a valve stem disposed in said bore and connected to said ball member, a pair of annular seats disposed in said chamber and adapted to engage said ball member, and a seat retainer for each of said annular seats adapted to retain one of said annular seats, an improvement in which said seat retainers are slidably movable in respective annular grooves in said chamber, each of said grooves being defined by inner and outer concentric walls interconnected by an end wall formed in said chamber, each of said grooves being disposed concentrically of said flow path and extending in a direction axially of said flow path, said slidable movement of said seat retainers thereby being in said direction axially of said flow path and between said inner and outer walls to permit floating of said seats, such that said seats and said seat retainers maintain contact with said ball member in assembly of said valve.

2. The ball valve in accordance with claim 1 in which each of said grooves is defined by said chamber and includes a seat member groove portion and a seat retainer groove portion, said seat members comprising annular elastomeric rings disposed in said seat member groove portions and said seat retainers comprising annular rigid rings disposed in said seat retainer groove portions, said seat retainer being configured so as in cooperation with said seat member groove portions to retain said seat members.

3. The ball valves in accordance with claim 2 in which said seat retainer groove portions are elongated in said axial direction and open on one side to said seat member groove portions.

4. The ball valve in accordance with claim 3 in which said seat retainers are L-shaped in cross-section, a head portion of each of said seat retainers engaging said ball and one of said seat members.

* * * * *